US010784506B1

(12) United States Patent
Snyder et al.

(10) Patent No.: US 10,784,506 B1
(45) Date of Patent: Sep. 22, 2020

(54) SOLID SOLUTION CATHODE FOR SOLID-STATE BATTERY

(71) Applicant: Apple Inc., Cupertino, CA (US)

(72) Inventors: Shawn W. Snyder, Santa Clara, CA (US); Damon E. Lytle, Cupertino, CA (US); Jeffrey J. Kelly, Santa Clara, CA (US); Ronald D. Brost, Whitefish, MT (US); Sandeep Rekhi, San Jose, CA (US); Bernd Jurgen Neudecker, Los Gatos, CA (US); Terry Tiegs, Lenoir City, TN (US)

(73) Assignee: Apple Inc., Cupertino, CA (US)

( * ) Notice: Subject to any disclaimer, the term of this patent is extended or adjusted under 35 U.S.C. 154(b) by 61 days.

(21) Appl. No.: 16/113,090

(22) Filed: Aug. 27, 2018

Related U.S. Application Data

(60) Provisional application No. 62/551,834, filed on Aug. 30, 2017.

(51) Int. Cl.
| | |
|---|---|
| *H01M 4/36* | (2006.01) |
| *H01M 4/48* | (2010.01) |
| *H01M 4/525* | (2010.01) |
| *H01M 10/052* | (2010.01) |
| *H01M 4/38* | (2006.01) |
| *H01M 10/0585* | (2010.01) |
| *H01M 4/505* | (2010.01) |
| *H01M 4/485* | (2010.01) |

(52) U.S. Cl.
CPC ......... *H01M 4/364* (2013.01); *H01M 4/382* (2013.01); *H01M 4/483* (2013.01); *H01M 4/485* (2013.01); *H01M 4/505* (2013.01); *H01M 4/525* (2013.01); *H01M 10/052* (2013.01); *H01M 10/0585* (2013.01)

(58) Field of Classification Search
CPC .......... H01M 10/052; H01M 10/0585; H01M 4/0471; H01M 4/131; H01M 4/1391; H01M 10/0562; H01M 4/364; H01M 4/382; H01M 4/483; H01M 4/485; H01M 4/505; H01M 4/525
See application file for complete search history.

(56) References Cited

U.S. PATENT DOCUMENTS

| 8,445,130 B2 | 5/2013 | Neudecker et al. |
| 8,703,337 B2 | 4/2014 | Ellenwood et al. |
| 2015/0037688 A1 | 2/2015 | Otsuka et al. |

(Continued)

*Primary Examiner* — Ula C Ruddock
*Assistant Examiner* — Armindo Carvalho, Jr.
(74) *Attorney, Agent, or Firm* — Young Basile Hanlon & MacFarlane, P.C.

(57) ABSTRACT

A cathode for a solid-state battery comprises a composite cathode active material formed of a layered lithium cobalt oxide (LCO) in a solid solution matrix of lithium oxide ($Li_2O$) and a cobalt oxide phase. For example, the composite cathode active material can be layered LCO in a solid solution matrix of one of $Li_2O$—$Li_xCo_{1-x}O$—$Co_3O_4$, $Li_2O$—$Li_xCo_{1-x}O$ and $Li_2O$—$Co_3O_4$, with $0 \leq x \leq 0.5$. The LCO is at least 80 wt. % of the composite cathode active material. The cathode is a sintered solid-state cathode wafer that is free-standing, upon which solid-state battery cells are fabricated.

20 Claims, 3 Drawing Sheets

(56) References Cited

U.S. PATENT DOCUMENTS

| | | | |
|---|---|---|---|
| 2015/0280276 A1* | 10/2015 | Lemke | H01M 10/0436 |
| | | | 361/679.55 |
| 2015/0284259 A1 | 10/2015 | Kim et al. | |
| 2016/0099482 A1* | 4/2016 | Anapolsky | H01M 10/058 |
| | | | 204/192.17 |
| 2016/0351910 A1* | 12/2016 | Albano | H01M 4/628 |
| 2017/0148614 A1* | 5/2017 | Satoh | C23C 14/083 |

* cited by examiner

SOLID SOLUTION CATHODE FOR SOLID-STATE BATTERY

CROSS-REFERENCE TO RELATED APPLICATIONS

This application claims the benefit of U.S. Provisional Application No. 62/551,834 filed on Aug. 30, 2017, the content of which is hereby incorporated by reference in its entirety for all purposes.

TECHNICAL FIELD

This application generally relates to cathodes for solid-state batteries.

BACKGROUND

Solid-state batteries generally have high energy densities, are more resistant to temperature extremes and do not leak electrolyte. However, solid-state batteries have lower power densities due to inherent difficulties with ion mobility and electronic resistance across the solid-solid interfaces.

SUMMARY

The disclosed embodiments provide a composite cathode active material for a solid-state cathode, comprising layered LCO in a solid solution matrix of $Li_2O$ and a cobalt oxide phase. The LCO is at least 80 wt. % of the composite cathode active material with a remainder comprising the $Li_2O$ and the cobalt oxide phase.

In some embodiments, the cobalt oxide phase is $Li_xCo_{1-x}Co_3O_4$ and the solid solution matrix is $Li_2O$—$Li_xCo_{1-x}O$—$Co_3O_4$, with $0 \leq x \leq 0.5$.

In some embodiments, the cobalt oxide phase is $Co_3O_4$ and the solid solution matrix is $Li_2O$—$Co_3O_4$.

In some embodiments, the cobalt oxide phase is $Li_xCo_{1-x}O$ and the solid solution matrix is $Li_2O$—$Li_xCo_{1-x}O$, with $0 \leq x \leq 0.5$.

In some embodiments, the remainder further comprises one or more of $Cr_2O_3$ and $LiCo_{0.33}Ni_{0.33}Mn_{0.33}O_2$ as additives.

In some embodiments, the composite cathode active material has a multi-modal particle size distribution between 0.1 micron and 6 microns, inclusive.

In some embodiments, the composite cathode active material has a thickness of greater than or equal to 5 μm and less than or equal to 150 μm.

In some embodiments, the composite cathode active material is free-standing.

In some embodiments, the composite cathode active material is a sintered solid-state cathode wafer.

The disclosed embodiments also include a cathode for a solid-state battery, comprising the composite cathode active material formed of a mixture of lithium cobalt oxide (LCO) and a solid solution matrix of lithium oxide ($Li_2O$) and a cobalt oxide phase.

The disclosed embodiments also include a cathode comprising a composite sintered solid-state cathode wafer of decomposed and partially recomposed LCO.

The disclosed embodiments also include a solid-state battery cell comprising a free-standing composite cathode active material formed of layered LCO in a solid solution matrix of $Li_2O$ and a cobalt oxide phase, a cathode current collector formed on the composite cathode active material, a solid electrolyte layer formed on the composite cathode active material opposite the cathode current collector, a lithium anode layer and an anode current collector.

Another aspect of the disclosed embodiments is a battery pack having a plurality of lithium metal batteries.

DETAILED DESCRIPTION

Cathodes in solid-state lithium batteries must contain both electronic and ionic conductive networks which facilitate the electron and lithium transport among cathode active material particles during lithiation and delithiation. However, poor lithium ion transport is typical among active particles in solid-state cathodes. Poor lithium ion transport between cathode active material particles, such as $LiCoO_2$ (LCO) particles, deteriorates the specific capacity of solid-state batteries, for example. Such lithium ion transport is difficult in part because the active material particles in the cathode do not contact each other directly. Rather, layered grains of LCO, for example, are commonly bonded together by a binder such as polyvinylidene fluoride (PVDF). Only those active material particles which directly contact the solid electrolyte can insert and extract lithium ions. Of the remaining active material particles, those bonded with the binder and not in direct contact with other active material particles cannot transport lithium ions to and from the solid electrolyte, resulting in low battery specific capacity. In addition, LCO starting material is generally intentionally over-lithiated to support cell performance. This extra lithium promotes lithium carbonate, an insulator, from residual lithium oxide reacting with carbon dioxide in the air. This insulator further degrades battery performance.

One objective in solid-state cathode development has been to identify a solid additive to the active material particles such as LCO that can both withstand the thermal processes during synthesis without decomposition with lithium compounds and stand up to the oxidation potential of the functioning cathode. Such a solid additive will actually promote both electronic and ionic conductivities rather than inhibit them.

The cathode active material disclosed herein provides a layered LCO for lithium storage that is interconnected with a lithium ion/electron-conducting lithiated cobalt oxide matrix. The LCO is at least 80 wt. % of the cathode active material. This cathode active material has resolved the cyclic reversibility and specific capacity issues with pure layered LCO.

The cathode active material disclosed herein is a composite cathode active material formed of a layered lithium cobalt oxide (LCO) in a solid solution matrix of lithium oxide ($Li_2O$) and a cobalt oxide phase, the solid solution matrix represented as $Li_2O$—$Li_xCo_{1-x}O$—$Co_3O_4$, $Li_2O$—

Figure 1:
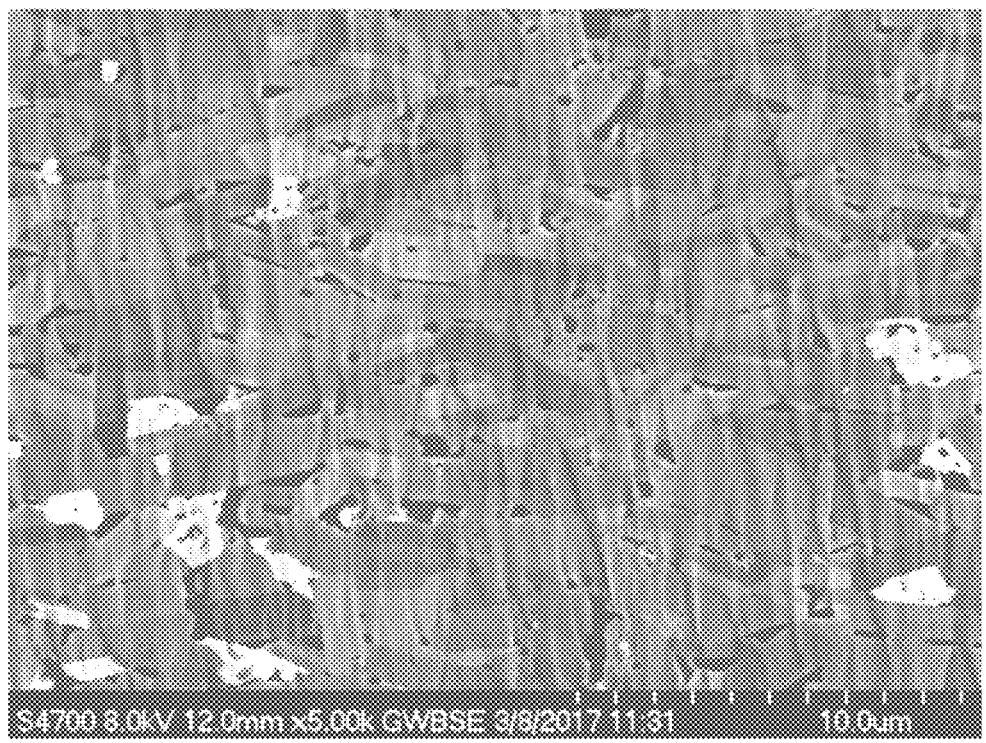
FIG. 1 is a scanning electron microscope (SEM) image of the composite cathode active material disclosed herein.

$Li_xCo_{1-x}O$ and $Li_2O$—$Co_3O_4$, with $0 \le x \le 0.5$. As non-limiting examples, the solid solution matrix can be $Li_2O$—$CoO$—$Co_3O_4$, $Li_2O$—$LiCoO_2$—$Co_3O_4$, and $Li_2O$—$Co_3O_4$. The LCO can be greater than or equal to about 80 wt. % of the cathode active material to provide the requisite energy density. The interconnected, randomly-ordered, small grains of $Li_2O$—$LiCo_{1-x}$—$Co_3O_4$ enable movement in three dimensions, providing both ionic and electronic conductivity throughout the cathode active material. FIG. 1 is an SEM image of the composite cathode active material formed of a layered LCO in a solid solution matrix of $Li_2O$—$Li_xCo_{1-x}O$—$Co_3O_4$. LCO fines may remain in the solid solution matrix after formation of the matrix.

The cathode active material has particle sizes of less than 10 microns. In some embodiments, the particle sizes are less than 5 microns. In some embodiments, the particle sizes are less than 1 micron. In some embodiment, the cathode active material has a multimodal particle size distribution in the range of 0.1 to 6 microns, inclusive.

LCO is processed to act as a composite cathode active material. In one embodiment, one of $Li_2O$—$Li_xCo_{1-x}O$—$Co_3O_4$, $Li_2O$—$Li_xCo_{1-x}O$ and $Li_2O$—$Co_3O_4$ can be provided in excess to ultimately produce a more ion conducting grain interface after LCO processing. The processing can be, for example, powder synthesis, tape casting and part sintering.

In another embodiment, decomposition of LCO followed by partial recomposition provides a much more conductive network than fully formed pure layered LCO. The decomposition of LCO can be achieved with vacuum or inert gas (Ar, $N_2$, etc.) sintering, chemical (carbon, hydrogen) sintering, thermal sintering or combinations of these reactions as non-limiting examples. The recomposition can be achieved with a lower temperature annealing process using air or pure $O_2$, or energetic plasma using an electron beam, $O_2$ doped, as non-limiting examples.

Figure 2:
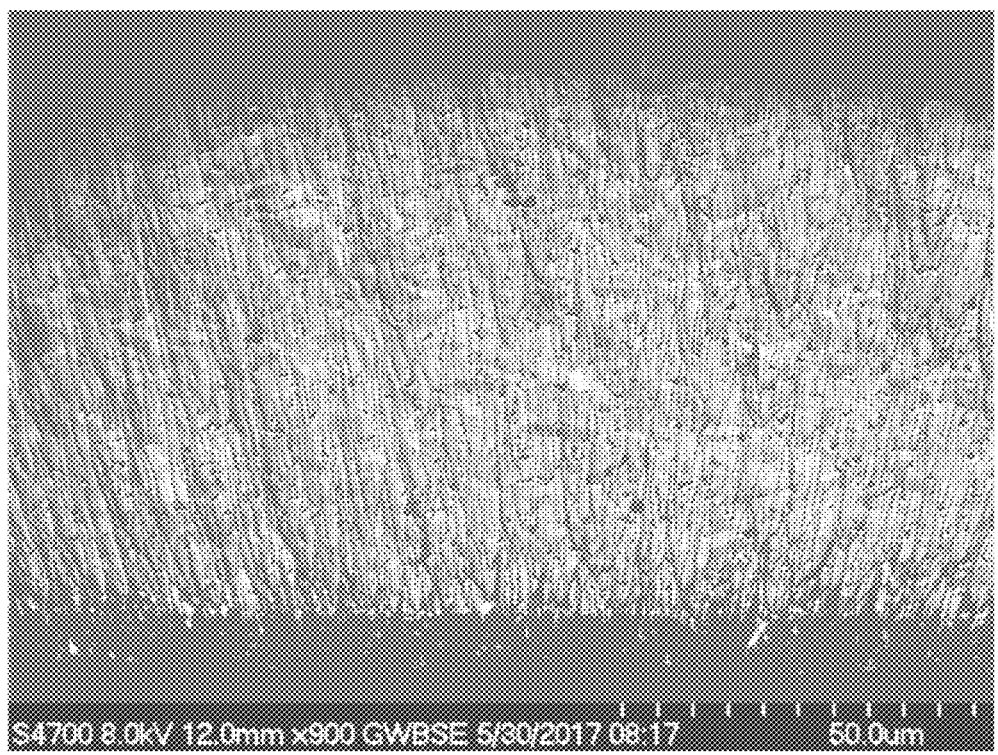
FIG. 2 is an SEM image of raw material for the production of the composite cathode active material of FIG. 1 after debinding.
Figure 3:
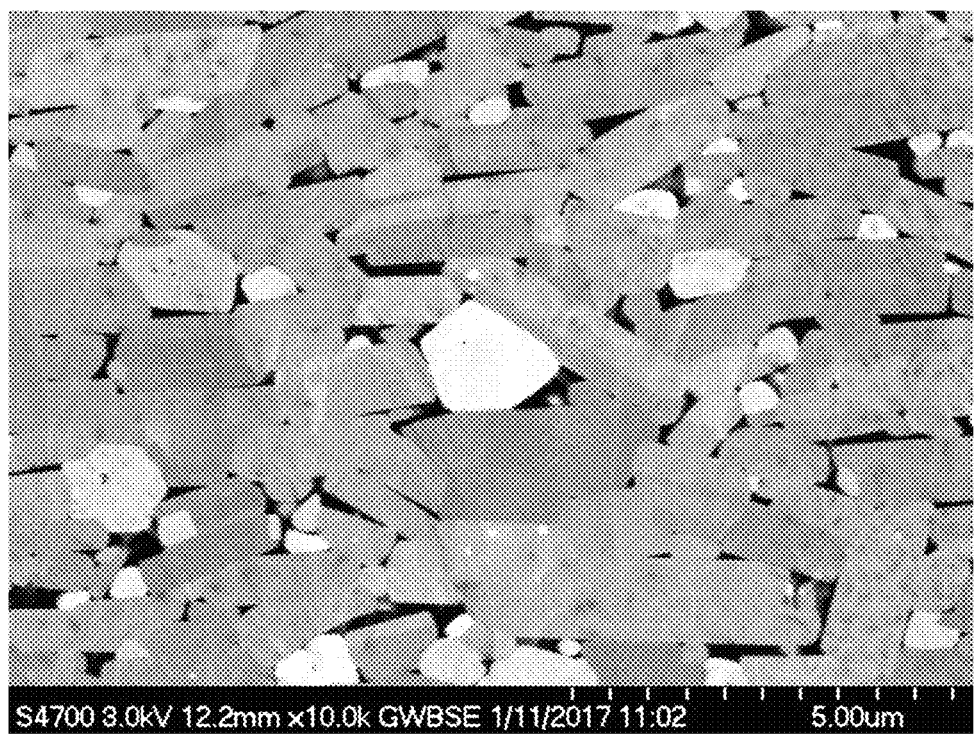
FIG. 3 is an SEM image of the material in FIG. 2 after at least partial decomposition of the debound material.

FIGS. 2 and 3 illustrate the decomposition and partial recomposition of LCO that results in the composite cathode active material formed of a layered LCO in a solid solution matrix of $Li_2O$—$Li_xCo_{1-x}O$—$Co_3O_4$ as disclosed herein. FIG. 2 is an SEM image of LCO powder mixed with the binder PVB after debinding. Debinding with heat removes the PVB and leaves some carbon behind. Debinding can be done at a temperature between about 200° C. and 400° C. The reaction is:

$LiCoO_2 + PVB + O_2 \rightarrow LiCoO_2 + C + CO_x\uparrow + H\text{-}C\text{-}O + H_2O\uparrow$.

FIG. 3 is an SEM image of the debound LCO after some of the LCO has decomposed after vacuum sintering. Vacuum sintering can be done at a temperature of about 700° C. to about 1000° C. LCO has decomposed to secondary phases of cobalt oxides and lithium oxides. The reaction can proceed with or without residual carbon from the binder:

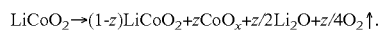
$LiCoO_2 \rightarrow (1-z)LiCoO_2 + zCoO_x + z/2Li_2O + z/4O_2\uparrow$.

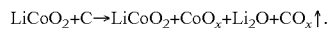
$LiCoO_2 + C \rightarrow LiCoO_2 + CoO_x + Li_2O + CO_x\uparrow$.

FIG. 1 is an SEM image of after vacuum sintering and then annealing the decomposed LCO to partially recompose the LCO as follows:

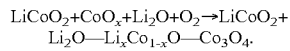
$LiCoO_2 + CoO_x + Li_2O + O_2 \rightarrow LiCoO_2 + Li_2O$—$Li_xCo_{1-x}O$—$Co_3O_4$.

$Li_2O$—$Li_xCo_{1-x}O$—$Co_3O_4$ is a solid solution of $Li_2O$, $Li_xCo_{1-x}O$ and $Co_3O_4$ with a variable composition of Li and Co. Annealing can take place at between about 500° C. and 900° C. Annealing reacts the secondary phases to a solid solution that interconnects the primary grains of LCO, resulting in layered LCO grains in a $Li_2O$—$Li_xCo_{1-x}O$—$Co_3O_4$ matrix.

The resulting composite cathode active material has no binder to interfere with contact between active material. Rather, the randomly-ordered small grains of the $Li_2O$—$Li_xCo_{1-x}O$—$Co_3O_4$ act as a binder for the LCO particles while their spinel-like matrix enables ion movement in three dimensions.

The resulting composite cathode active material has at least 80 wt. % LCO with the remainder of the material comprising the matrix of lithium oxide and the cobalt oxide phase. The remainder may include additives, such as sintering aids used for mechanical strength and/or for their electrochemical properties. Examples of additives include, but are not limited to, $Cr_2O_3$ and $LiCo_{0.33}Ni_{0.33}Mn_{0.33}O_2$. The additives can be about 5 wt. % or less, 4 wt. % or less, 3 wt. % or less, 2 wt. % or less, or 1 wt. % or less. For example, the composite cathode active material can have a composition including 80 wt. % or more LCO, 5 wt. % or less additives, and the remaining consisting of the matrix of lithium oxide and the cobalt oxide phase.

The cathode active material can be made free-standing, i.e., without a substrate on which the material is deposited or coated. Unlike conventional solid-state cathode materials, there is no substrate which adds volume to the battery cell without contributing to performance, resulting in a more energy dense structure. Thus, the entire thickness of the cathode active material contributes to the performance of the battery. The cathode active material itself becomes the mechanical support body for the battery cell components.

Figure 4A:
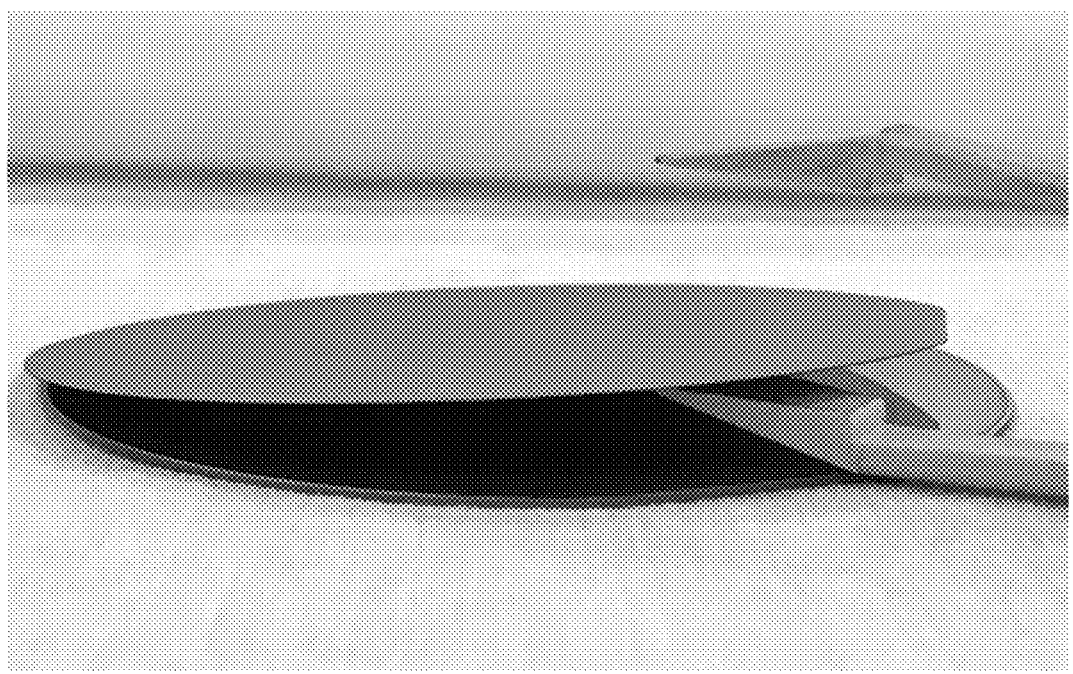
FIG. 4A is a side perspective image of a solid-state cathode wafer as disclosed herein.
Figure 4B:
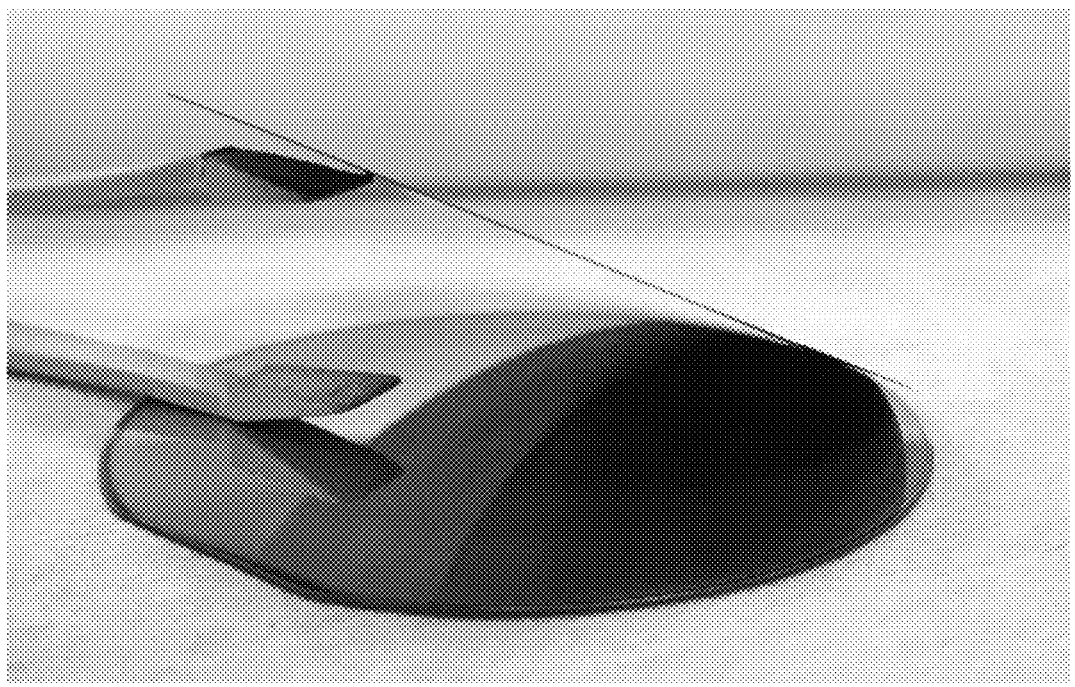
FIG. 4B is a side view of the solid-state cathode water of FIG. 4A.

Conventional deposition and coating processes can limit the thickness of the cathode active material. For example, vapor-phase deposition of LCO typically can produce a cathode active material layer of up to about 20 μm. The processes utilized to make the free-standing composite cathode active material disclosed herein can achieve thicknesses of greater than or equal to 5 μm. For example, free-standing cathodes can be produced with a thickness of between about 20 μm and about 45 μm. Thicknesses of up to about 150 μm are contemplated. FIGS. 4A and 4B are examples of a free-standing composite cathode active material in wafer form having a diameter of two inches and a thickness of 80 μm. Energy density gains increase as a function of the thickness of the cathode active material and the diffusivity of the Li ions through the solid-solution matrix. The free-standing composite cathode active material can serve as a base on which other battery cell materials are fabricated.

Figure 5:
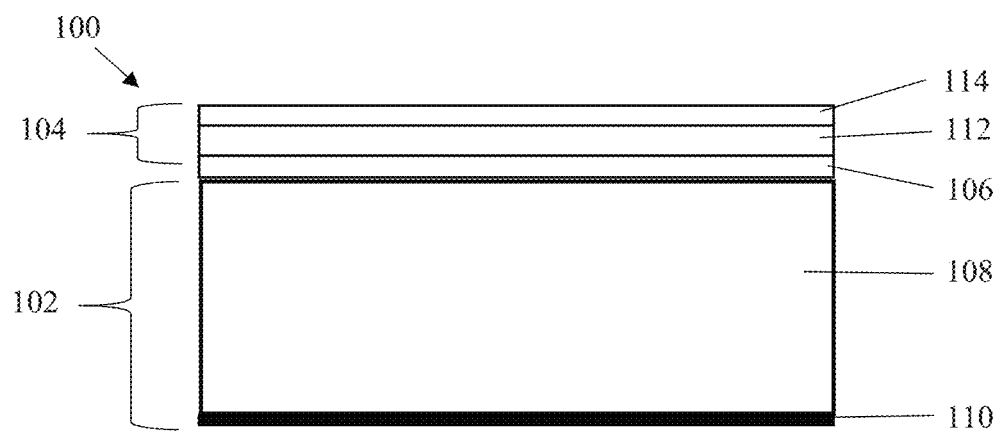
FIG. 5 is a schematic of a solid-state battery cell as disclosed herein.

A solid-state battery cell 100 is shown in FIG. 5 and has a cathode 102, anode 104 and a solid electrolyte layer 106. The cathode 102 includes a free-standing composite cathode active material 108 formed of a mixture of lithium cobalt oxide and a solid solution of lithium cobalt oxide, lithium oxide and cobalt oxide as disclosed herein, with a cathode current collector 110 formed on the composite cathode active material 108. The solid electrolyte layer 106 is formed on the composite cathode active material 102 opposite the cathode current collector 110. The anode 104 includes an anode active material layer 112 opposite the solid electrolyte layer 106 and an anode current collector 114 on the anode active material layer 112.

The composite cathode active material layer 108 is thick when compared to the relative sizes of the solid electrolyte layer 106 and the anode 104 formed over the solid electrolyte layer 106. For lithium metal anodes, the anode will grow by approximately one-third the thickness of the composite cathode active material layer 108 upon charging, due to Li metal plating.

The cathode current collector 110 can be deposited onto the free-standing composite cathode active material 108 using, for example, vapor-phase deposition, to complete the cathode 102. The cathode current collector 110 can be aluminum or an aluminum alloy, as non-limiting examples. The cathode current collector 110 can be made very thin, having a thickness between about 200 Angstroms and about 4000 Angstroms. The cathode current collector 110 can have a thickness up to about 20,000 Angstroms if desired.

As shown in FIG. 5, the solid electrolyte layer 106 is deposited on the surface of the composite cathode active material 108 opposite the cathode current collector 110. The solid electrolyte layer may comprise lithium phosphorus oxynitride (LiPON) or other solid-state thin-film electrolytes such as $LiAlF_4$ or $Li_3PO_4$ doped $Li_4SiS_4$, as non-limiting examples. The solid electrolyte layer 106 may be less than about 10 μm thick. The solid electrolyte layer 106 may be 1 μm thick, for example.

The anode active material layer 112 may comprise, for example, lithium, lithium alloys, metals that can form solid solutions or chemical compounds with lithium, or any lithium-ion compound that may be used as a negative anode material in lithium-based batteries, such as, for example, $Li_4Ti_5O_{12}$. The anode active material 112, for example, may be deposited to a thickness of less than about 30 μm. An anode current collector 114 is deposited on the anode active material 112.

The solid electrolyte layer 106 and the anode active material layer 112 may be deposited using a variety of methods. These methods may include, for example, vacuum vapor phase growth methods or non-vapor phase methods. Vacuum vapor phase methods may include, for example, reactive or non-reactive RF magnetron sputtering, reactive or non-reactive DC diode sputtering, reactive or non-reactive thermal (resistive) evaporation, reactive or non-reactive electron beam evaporation, ion-beam assisted deposition, plasma enhanced chemical vapor deposition or the like. Non-vapor phase methods may include, for example, spin coating, ink-jetting, thermal spray deposition or dip coating.

Example

The composite cathode active material disclosed herein can be prepared as in the following non-limiting example.

LCO powder with a binder is tape cast on a conveyor. Sintering aids may be added to the tape to promote density at lower temperatures and/or pressures. The tape undergoes debinding at a temperature of between about 200° C. and 400° C. to remove the binder. The tape is then vacuum sintered in a conveyor oven to densify the LCO and at least partially decompose the LCO. Sintering also provides bonding of the LCO particles together and increases the mechanical strength and durability of the cathode material. The sintering can be done at a temperature of between about 700° C. and about 1000° C. and pressure between about 0 psi to 2000 psi for up to about eight hours. The sintered tape is then annealed at a temperature between about 500° C. and about 900° C. and for between about ten minutes to about eight hours to partially recompose the LCO and react secondary phases to form a solid solution that interconnects the primary LCO grains. Hot pressing may be added to the process to enhance the density of the resulting solid-state cathode wafer. Noble metals and some transition metals can be used, as non-limiting examples, as non-contaminating and free-release hot pressing media for the composite cathode active material.

The solid-state cathode wafer of layered LCO and a solid solution matrix of one of $Li_2O$—$Li_xCo_{1-x}O$—$Co_3O_4$, $Li_2O$—$Li_xCo_{1-x}O$ and $Li_2O$—$Co_3O_4$, with $0 \leq x \leq 0.5$, can be cut from the tape cast using laser cutting. The composite sintered solid-state cathode wafer is provided to a coating system for the cathode current collector, solid electrolyte and lithium anode. The resulting solid-state battery cell 100 then sees laser cutting or ablation with either short pulse length (femtosecond) or low absorption (UV) or both to avoid masking of coatings and to fashion cell interconnect spaces. This can be followed by integration of interconnects, a battery management unit and packaging, such as a pouch or can.

The solid-state cathode wafers disclosed herein may be beneficial for conventional batteries using liquid systems as the solid-state grain clusters provide solid-state fast pathways, which would improve battery performance. Solid-state cathode wafers can be configured for electronic devices as well as for automotive applications.

Additional layers can be coated on the solid-state cathode wafer.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art.

What is claimed is:

1. A cathode for a solid-state battery, comprising a composite cathode active material formed of a layered lithium cobalt oxide (LCO) in a solid solution matrix of lithium oxide ($Li_2O$) and a cobalt oxide phase, wherein LCO is at least 80 wt. % of the composite cathode active material with a remainder comprising the $Li_2O$ and the cobalt oxide phase.

2. The cathode of claim 1 wherein the cobalt oxide phase is $Li_xCo_{1-x}Co_3O_4$ and the solid solution matrix is $Li_2O$—$Li_xCo_{1-x}O$—$Co_3O_4$, with $0 \leq x \leq 0.5$.

3. The cathode of claim 1, wherein the cobalt oxide phase is $Co_3O_4$ and the solid solution matrix is $Li_2O$—$Co_3O_4$.

4. The cathode of claim 1, wherein the cobalt oxide phase is $Li_xCo_{1-x}O$ and the solid solution matrix is $Li_2O$—$Li_xCo_{1-x}O$, with $0 \leq x \leq 0.5$.

5. The cathode of claim 1, wherein the composite cathode active material has a thickness of greater than or equal to 5 μm and less than or equal to 150 μm.

6. The cathode of claim 1, wherein the composite cathode active material is a free-standing structure.

7. The cathode of claim 6, wherein the free-standing structure is a sintered solid-state cathode wafer.

8. The cathode of claim 1, further comprising a cathode current collector formed on the composite cathode active material.

9. The cathode of claim 1, wherein the remainder further comprises one or more of $Cr_2O_3$ and $LiCo_{0.33}Ni_{0.33}Mn_{0.33}O_2$ as additives.

10. The cathode of claim 1, wherein the composite cathode active material has a multi-modal particle size distribution between 0.1 micron and 6 microns, inclusive.

11. A solid-state battery cell comprising:
a free-standing composite cathode active material formed of layered LCO in a solid solution matrix of $Li_2O$ and a cobalt oxide phase, the composite cathode active material being at least 80 wt. % LCO;

a cathode current collector formed on the composite cathode active material;

a solid electrolyte layer formed on the composite cathode active material opposite the cathode current collector;

a lithium anode layer; and an anode current collector.

12. The solid-state battery cell of claim 11 wherein the cobalt oxide phase is one of $Li_xCo_{1-x}O$ and $Li_xCo_{1-x}Co_3O_4$ and the solid solution matrix is one of $Li_2O$—$Li_xCo_{1-x}O$ and $Li_2O$—$Li_xCo_{1-x}O$—$Co_3O_4$, with $0 \leq x \leq 0.5$.

13. The solid-state battery cell of claim 11, wherein the cobalt oxide phase is $Co_3O_4$ and the solid solution matrix is $Li_2O$—$Co_3O_4$.

14. The solid-state battery cell of claim 11, wherein the solid electrolyte layer is about 1 μm in thickness.

15. The solid-state battery cell of claim 11, wherein the solid electrolyte layer is deposited directly on the composite cathode active material.

16. The solid-state battery cell of claim 11, wherein the lithium anode is one or more materials selected from lithium, lithium alloy, a metal that can form a solid solution with lithium, and a lithium-ion compound capable of performing as a negative anode.

17. A cathode comprising a composite sintered solid-state cathode wafer comprising at least 80 wt. % of decomposed then partially recomposed LCO, the composite sintered solid-state cathode wafer being free-standing.

18. The cathode of claim 17, wherein the decomposed and partially recomposed LCO forms a mixture of LCO and a solid solution of $Li_2O$ and a cobalt oxide phase.

19. The cathode of claim 17, wherein the decomposed and partially recomposed LCO forms layered LCO in a solid solution matrix of one of $Li_2O$—$Co_3O_4$, $Li_2O$—$Li_xCo_{1-x}O$, and $Li_2O$ $Li_2OLi_xCo_{1-x}O$—$Co_3O_4$, with $0 \leq x \leq 0.5$.

20. The cathode of claim 17, wherein the composite cathode active material has a multi-modal particle size distribution between 0.1 micron and 6 microns, inclusive.

* * * * *

UNITED STATES PATENT AND TRADEMARK OFFICE
CERTIFICATE OF CORRECTION

PATENT NO. : 10,784,506 B1
APPLICATION NO. : 16/113090
DATED : September 22, 2020
INVENTOR(S) : Shawn William Snyder et al.

It is certified that error appears in the above-identified patent and that said Letters Patent is hereby corrected as shown below:

In the Specification

At Column 1, Line number 34, "$Li_xCo_{1-x}Co_3O_4$" should be --$Li_xCo_{1-x}O$-$Co_3O_4$--.

At Column 3, Line number 7, "$Li_2O$-$LiCo_{1-x}$-$Co_3O_4$" should be --$Li_2O$-$Li_xCo_{1-x}O$-$Co_3O_4$--.

In the Claims

At Column 6, Claim number 2, Line number 40, "$Li_xCo_{1-x}Co_3O_4$" should be --$Li_xCo_{1-x}O$-$Co_3O_4$--.

At Column 7, Claim number 12, Line number 8, "$Li_xCo_{1-x}Co_3O_4$" should be --$Li_xCo_{1-x}O$-$Co_3O_4$--.

At Column 8, Claim number 19, Line number 14, "$Li_2O\ Li_2OLi_xCo_{1-x}O$-$Co_3O_4$" should be --$Li_2O$-$Li_xCo_{1-x}O$-$Co_3O_4$--.

Signed and Sealed this
Twenty-second Day of December, 2020

Andrei Iancu
*Director of the United States Patent and Trademark Office*